Sept. 1, 1931.  J. SKOGMARK ET AL  1,821,064
METHOD FOR THE PURIFICATION OF GASES
Filed June 30, 1927
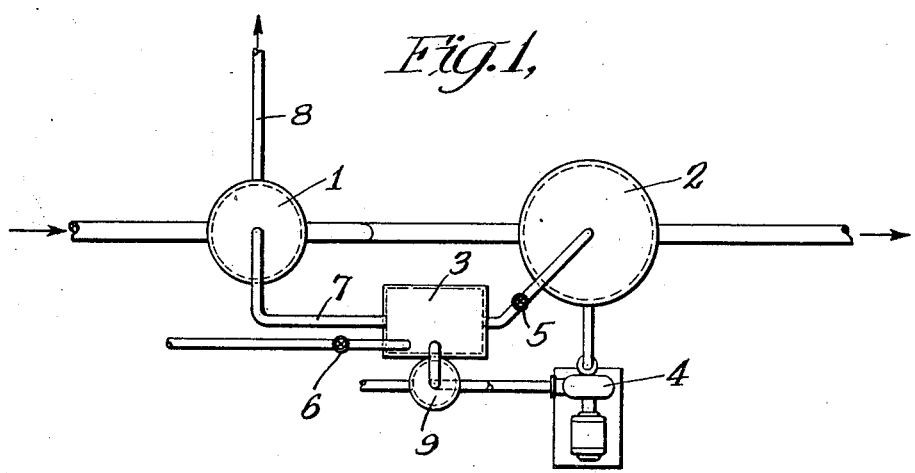
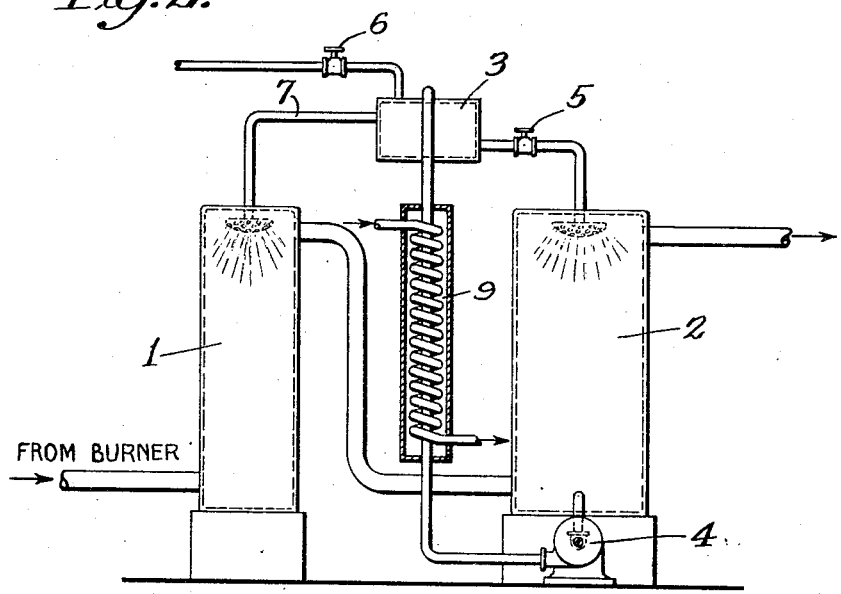
Inventors
JOHN SKOGMARK
MARCH F. CHASE
By their Attorney.
Merrell E Clark Patented Sept. 1, 1931

1,821,064

UNITED STATES PATENT OFFICE

JOHN SKOGMARK AND MARCH F. CHASE, OF NEW YORK, N. Y.

METHOD FOR THE PURIFICATION OF GASES

Application filed June 30, 1927. Serial No. 202,493.

This invention relates to methods and apparatus for the purification of gases. Although not limited thereto, the invention in one of its embodiments has been found to be particularly adaptable to the purification of gases known as burner gases containing sulphur dioxide as used in the manufacture of sulphuric acid. The invention in various of its phases and embodiments is adapted to be used for the purification of sulphur dioxide as well as other gases used in connection with other processes and for various other purposes.

According to this invention, apparatus is provided for washing the gases, for example with water, to remove undesired substances and impurities, particularly such materials as are readily soluble in the washing liquid at the particular temperature at which it is maintained. The apparatus is preferably so constructed and arranged that the incoming gases to be treated are at a temperature such as to permit a considerable transfer of heat to take place between such gases and a quantity of the washing liquid bearing the impurities as it passes out of the apparatus, such transfer of heat causing this outgoing washing liquid to deliver up any of the desired gas which it may have absorbed during the washing operation. Provision also is preferably made to circulate the main body of the washing liquid and at the same time maintain such liquid at the desired temperature for efficient washing action. The apparatus is also preferably arranged so that the desired gases which have been purified therein will pass out of the apparatus at a temperature such as to substantially inhibit the presence therein of vapor or vapors from the washing liquid.

A relatively simple and a highly efficient and dependable construction is provided for the desired purposes and the apparatus may be readily constructed and placed in operation by making use of parts which are easily obtainable.

Various further and more specific objects, features and advantages will clearly appear from the detailed description given below taken in connection with the accompanying drawings which form a part of this specification.

The invention consists in the process and steps of the process which are hereinafter described according to the preferred manner of practicing the same together with the novel features, arrangements and combination of parts embodied by way of example in the apparatus here described as illustrating a preferred form of such apparatus, and the invention may be more particularly pointed out in the appended claims.

In the drawings, Fig. 1 is a plan view and Fig. 2 is an elevational view of one form of the apparatus embodying the invention.

Referring to the particular apparatus shown in the drawings, the parts designated by the numerals 1 and 2 may comprise columns or towers packed with suitable packing materials as well known in the art of acid making. The column 1 may be relatively smaller than column 2. A small tank or reservoir is provided above the towers at 3 for the washing liquid which may be circulated through the tower 2 in any suitable manner as by a rotary pump 4, the rate of flow of the circulating liquid being adjustable by a valve 5. A conduit is provided for conveying fresh washing liquid to the reservoir 3 and the rate of flow of such fresh washing liquid into the reservoir is adjustable by means of a supply valve 6 located as shown in the supply conduit. The reservoir is provided with an overflow conduit 7 which provides a source of supply for a spray of the washing liquid in the tower or column 1. Such overflow washing liquid may pass out at the bottom of the tower 1 through an outlet conduit 8.

The washing fluid as circulated by the pump 4 may be maintained at the desired temperature for efficient scrubbing or washing action within the tower 2 by the use of a suitable known form of heat transferring device, as indicated at 9.

The above described apparatus has been found to be particularly adaptable for use in the manufacture of sulphuric acid and specifically in the purification of sulphur dioxide gas in such manufacture. The gas containing sulphur dioxide as used for the sulphuric acid is generally produced by burning brimstone, or pyrites, or by calcining metallic sulphide ores. In each of these cases the resulting gases containing the sulphur dioxide are available in heated condition usually at a temperature higher than 100° C. and contain in addition to sulphur dioxide, materials such as arsenic, chlorine, fluorine and impurities which are to be removed before the sulphur dioxide passes to the next stage of the process. Such gas is ordinarily purified by washing or scrubbing the same with water and/or sulphuric acid and then filtering in such a manner as to remove both solid and gaseous impurities which may affect the activity of the catalysts customarily used in the further oxidation of the gas in the succeeding stages of the process.

The subject matter of this invention is applicable particularly to the purification step comprising the removal of such impurities as arsenic, chlorine, fluorine, etc., which are soluble in water. The operation of the process as carried out in the particular form of apparatus above described may be as follows:

The gases to be purified, while still heated to a temperature usually above 100° C., enter the column 1 at the bottom and pass up through this column in countercurrent to the spray of washing liquid from the overflow conduit 7. From the top of this column the gases are conducted to the bottom of column 2, pass upwardly through column 2 and through an outlet at the top of column 2. In passing through column 1 the gases meet the overflow liquid, in this case water, which is supplied through the conduit 7 and the temperature of the gas is thereby considerably lowered, for example to a temperature in the neighborhood of 40° C., since the wash water as circulated through the column 2 and the reservoir 3 is constantly maintained at a moderately low temperature by the device 9, which in this instance comprises a cooling coil. Certain of the impurities may also be removed by the preliminary washing in column 1, so that the percentages of impurities in the gases entering the larger washing column 2 are somewhat lessened. In the washing column 2 the gases are thoroughly scrubbed or washed to the extent desired and at the same time the gas temperature is further lowered by the circulating cooled wash water. At the top of the column 2 the gases are subjected to wash water directly from the reservoir 3 and cooler 9 and are cooled to a temperature, for example in the neighborhood of 30° C., or such that moisture in the outlet gas is reduced substantially to a minimum. The gases at the outlet are also last subjected to the relatively fresh water directly from the reservoir 3. In view of the preliminary washing effected in column 1, the washing liquid may be circulated for a considerable time without becoming overcharged with impurities and it is found that the washing liquid may thus be very efficiently utilized since the rate of flow through the inlet valve 6 into the reservoir and out through the overflow pipe 7 may be kept low, yet the rate of circulation through column 2 may be relatively high. In column 2 the gases encounter a large flow of water at a moderately low temperature, even though the supply of washing liquid through the valve 6 is kept substantially at a minimum and the outlet water is discharged at a high temperature for the purposes stated. It will be noted that the valve 6 may be regulated to determine the rate at which the washing liquid from the source of supply is utilized, while the valve 5 may be independently regulated to determine the rate of circulation of such liquid. That is, the rate of circulation through the column 2 is adjustable in respect to the rate of supply and overflow. The proper adjustments under particular prevailing conditions may be readily determined by trial. The quantity of water flowing through the outlet 8 will be equal to that furnished through the supply valve 6 except for a very small quantity which may be vaporized and carried away with the gases.

The wash water passing from the reservoir 3 into column 1, having been maintained at a moderately cool temperature, for example in the neighborhood of 25° C., ordinarily has dissolved therein substantial quantities of sulphur dioxide taken up during the washing process in column 2. However, upon meeting the incoming hot gases, the temperature of this overflow water may be raised, for example to 60° C., or to a point such that it delivers up the greater part of its dissolved sulphur dioxide to the incoming body of hot gas and finally flows out of the outlet 8 at a relatively high temperature such as to substantially preclude the carrying away therein of sulphur dioxide or other desired gases under treatment.

It will thus be seen by the use of the above apparatus and process that the heat of the inflowing hot gases is used to practical advantage to recover desired gases which would otherwise be carried away in the wash water. At the same time, the purified gases are delivered to the outlet of column 2 under the desirable conditions of low temperature and contact with relatively fresh wash water.

It is not desired to limit the invention to the details or examples herein described since it will be obvious to those skilled in the art, after understanding the invention, that various modifications and substitutions may be made without departing from the scope of the invention, and it is desired therefore in the appended claims to cover all such modifications.

What is claimed as new and desired to be secured by Letters Patent of the United States is:

1. The process of preparing and purifying gas which comprises producing the same at a high temperature and washing the same in two stages, in the first stage utilizing the heat, while still available in the gas, to heat overflow wash liquid previously used in the second stage, whereby gas dissolved in such liquid is given up for recovery and the gas is given a preliminary washing and cooling preparatory to thorough washing in the second stage, the wash liquid in the second stage being recirculated countercurrent to the gas and independently of the overflow and maintained at a temperature to substantially minimize vaporization thereof.

2. The process of purifying gases which comprises washing the same with fluid which is repeatedly circulated and maintained at a temperature substantially different from that of the gases as supplied, slowly and continuously withdrawing a part of said fluid and permitting a substantial transfer of heat to take place between such withdrawn fluid and the supply of gases to be washed.

3. The process for purifying hot burner gases containing sulphur dioxide, which comprises recirculating a quantity of water counter current to the flow of the gas, cooling the water to remove the heat absorbed during the washing, continuously withdrawing a part of said water, circulating this portion counter current to the flow of the supply gas to be washed and adding fresh water to replace that withdrawn.

4. The process for purifying hot gases which comprises washing the same in two stages, in the first stage contacting the hot gas with a portion of the wash water used in the second stage and in the second stage recirculating the remainder of the wash water counter current to the flow of the gas, cooling the recirculated wash water to remove the heat absorbed from the gas and adding wash water to replace the portion used in the first stage.

5. The process for purifying hot burner gases containing sulphur dioxide, which comprises recirculating a quantity of water counter current to the flow of the gas cooling the water to remove the heat absorbed during the washing and to such a temperature that the gas leaving the washer will be cooled to about 30° C., withdrawing a portion of the washing water and contacting it with the hot gas in such proportions that the outgoing water will be heated to about 60° C., and adding fresh washing water to replace that withdrawn.

6. A process for purifying hot gases comprising recirculating a washing liquid to contact it with the gases, cooling the washing liquid while it is being recirculated, continuously withdrawing a relatively small portion of the liquid being recirculated and discharging it after passing it in contact with the hot gases before they are subjected to the main washing stage, and adding washing liquid to replace the liquid withdrawn.

In testimony whereof we have signed our names to this specification.

JOHN SKOGMARK.
MARCH F. CHASE.